United States Patent [19]

Mori

[11] 3,895,876

[45] July 22, 1975

[54] QUANTIZED INDICATION APPARATUS

[75] Inventor: Chiharu Mori, Tokyo, Japan

[73] Assignee: Asahi Kogaku Kogyo Kabushiki Kaisha, Tokyo, Japan

[22] Filed: Sept. 10, 1973

[21] Appl. No.: 395,660

Related U.S. Application Data

[63] Continuation-in-part of Ser. No. 286,988, Sept. 7, 1972, Pat. No. 3,828,253.

[30] Foreign Application Priority Data

Sept. 11, 1972 Japan .............................. 47-91030

[52] U.S. Cl. ................ 356/226; 356/223; 356/227; 354/24

[51] Int. Cl. .............................................. G01j 1/44

[58] Field of Search.................... 356/223, 226, 227; 250/214; 354/24

[56] References Cited

UNITED STATES PATENTS 3,723,014 3/1973 Nanba................................ 356/226

3,737,240 6/1973 Wagner.............................. 356/226

*Primary Examiner*—Ronald L. Wibert
*Assistant Examiner*—Conrad Clark
*Attorney, Agent, or Firm*—Christie, Parker & Hale

[57] ABSTRACT

Apparatus provides a quantized indication of a variable parameter that varies in relation to a variable signal advantageously provided by a photosensitive device in a camera. Preferably, exposure time is the indicated parameter, exposure time being of course a function of object brightness. The apparatus comprises a logarithmic compression circuit, a plurality of logarithmic expansion circuits each responsive to the logarithmic compression circuit, and indicating means including a plurality of switching elements each having a different threshold of switching. Preferably, the switching elements control lamps that are selectively lit to indicate which of a plurality of ranges encompasses the exposure time.

10 Claims, 1 Drawing Figure

QUANTIZED INDICATION APPARATUS

CROSS REFERENCE TO RELATED APPLICATIONS

This is a continuation-in-part of my copending application Ser. No. 286,988 (now U.S. Pat. No. 3,828,253 entitled "Quantizing Indication Arrangement" filed Sept. 7, 1972 and claiming priority based on Japanese patent application No. 1971-70510 filed Sept. 11, 1971.

Another related application is my copending application Ser. No. 289,983 filed Sept. 18, 1972 (now U.S. Pat. No. 3,807,879.

BACKGROUND OF THE INVENTION

In general, this invention relates to quantized indication apparatus. A preferred embodiment relates in particular to quantized indication of photographic exposure parameters for use in cameras.

Conventionally, light measurement values and exposure time values have been indicated by means of ammeters. An ammeter provides an analog or continuously varying indication. This approach has a number of disadvantages. Among these are mechanical problems and, importantly, the difficulty incident to attempting to read the ammeter scale in a dark place.

In order to overcome these difficulties there have been proposed various quantized indication systems. In a conventional system of this type, the input signals are transformed into a pulse number which is counted by multiple stage pulse counters, and the counted numbers memorized and indicated. The disadvantage of this method is that when the input signal is continuously changing, it is necessary to reset and then again to make pulse number transformation of the input signal and count the pulse number. As a result, it is difficult to make a satisfactory continuous indication.

SUMMARY OF THE INVENTION

The apparatus of this invention provides a quantized indication of a variable parameter that varies in relation to a variable signal.

Advantageously, the variable signal is provided by a photosensitive device in a camera having a built-in exposure meter. The apparatus comprises a logarithmic compression circuit including a controllable voltage source that provides a first voltage that varies in logarithmic relationship with respect to variations in the signal. Advantageously, the first voltage has a value proportional to a selected one of the APEX-represented photographic parameters. A plurality of logarithmic expansion circuits each include a voltage-controlled current source controlled by the first voltage. Each expansion circuit has an inverse-logarithmic voltage-in to current-out characteristic. Indicating means include a plurality of threshold-detecting switching elements. Each switching element is operative to switch between opposite switching conditions in accordance with the value of the current out of a respective one of the connector circuits. Preferably, the switching elements control lamps that are selectively lit to indicate which of a plurality of ranges encompasses an optimum exposure time.

DETAILED DESCRIPTION

Figure 1:
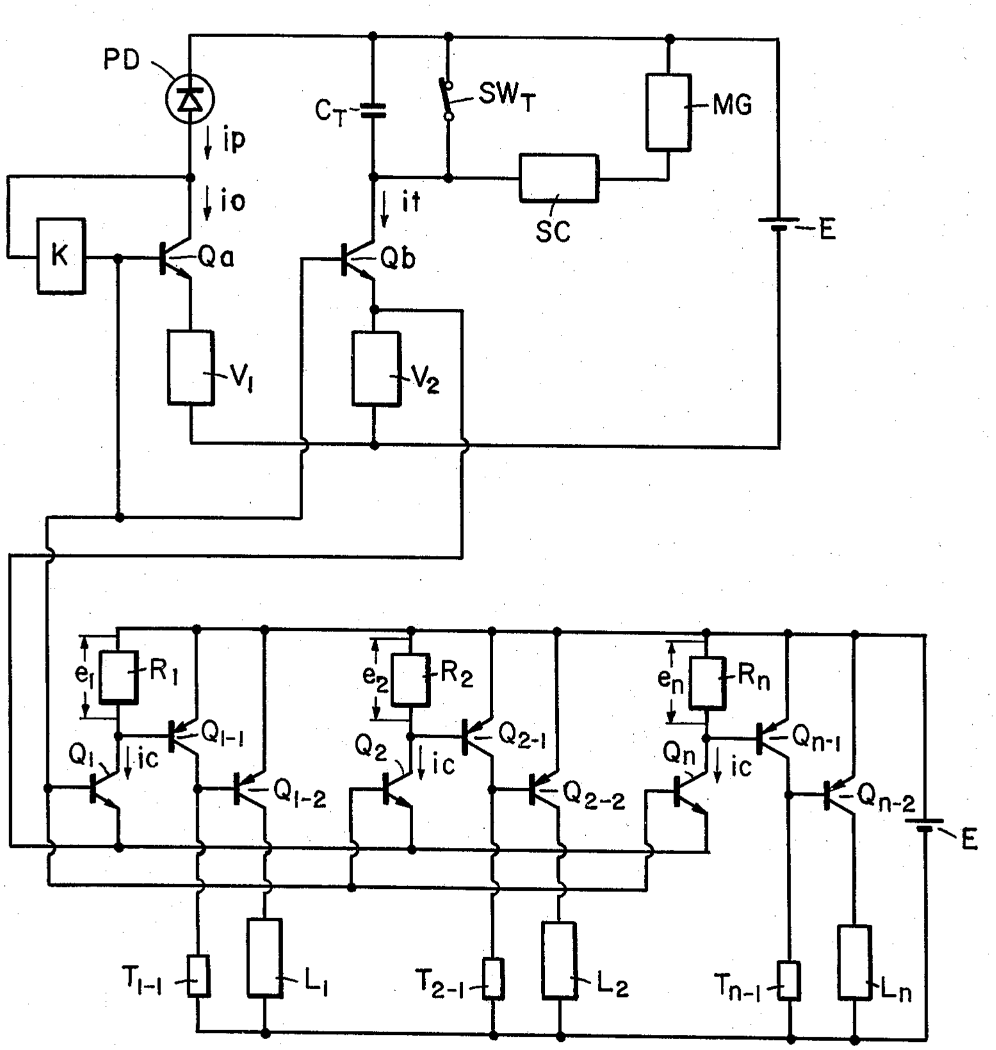
FIGURE 1 is a schematic and block diagram showing a preferred embodiment of this invention.

By way of further background to the detailed description of the preferred apparatus of this invention, there will first be described certain general matters pertinent to photometric measurements and computations. In this description, "B" means object brightness, "S" means film sensitivity, "A" means diaphragm value, and "T" means exposure time.

To each of the above factors there is assigned in the APEX system a corresponding APEX-represented value, these being $B_V$, $S_V$, $A_V$, and $T_V$.

In the APEX system there is established the following addition-system relation.

$$T_V + A_V = B_V + S_V \tag{1}$$

The photometric computation according to formula (1) is made with logarithmic transformation of the exposure-value determining factors *B*, *S*, *A*, and *T*.

A voltage $V_B$ is associated with the APEX-represented value $B_V$ (and thus also to object brightness B). In formula (2) given below, the voltage $V_B$ is given in terms of the APEX-represented value $B_V$ and a voltage $v_o$ which is the value of the voltage corresponding to unity variation of the value $B_V$.

$$V_B = B_V \cdot v_o \tag{2}$$

Further, in connection with diaphragm value A and the film sensitivity S, there are obtained in the same manner as in the relation (2) the voltage: $V_A = A_V \cdot v_o$ and $V_S = S_V \cdot v_o$. Then, according to the relation (1) and by means of an electric computation circuit, there is obtained a voltage:

$$T_V \cdot v_o = (B_V - A_V) \cdot v_o \tag{3}$$

This voltage $T_V \cdot v_o$ is inverse-logarithmically transformed, that is, it is logarithmically expanded into a current value which is inversely proportional to the exposure time *T* that corresponds to the value $T_V$. Timing of this exposure is obtained by charging a capacitor with this current up to a certain value.

With reference to FIGURE 1, there will now be described the preferred embodiment of this invention.

Operating power for the apparatus is provided by an electrical source E such as a self-contained battery within a camera (not shown). A photo diode PD is connected between the positive terminal of the battery and the collector of a transistor $Q_a$. The photo diode thus is operated in a reverse bias condition, as is conventional.

As is well known, when a photo diode PD is illuminated by the light input from an object to be photographed, the photo diode PD functions as a constant-current source. The current flowing through it ($i_p$) has a value which is determined by the amount of illumination impinging on the light receiving surface of the photo diode. By constant-current source, it is meant that the current flowing through the diode is substantially or completely unaffected by the voltage across it.

The transistor $Q_a$ is arranged in a self-biasing circuit. To this end, a buffer circuit K is connected between the collector and base electrodes of the transistor $Q_a$. Preferably, the buffer circuit K includes a source follower (not shown). The source follower arrangement is preferred because it features the operating characteristics of high input impedance and low output impedance available through the use of a field effect transistor (FET).

By virtue of the foregoing self-biasing arrangement, the transistor $Q_a$ operates with a collector current $i_o$ that is substantially or identically equal to the current $i_p$. As is well known, there is a logarithmic relationship between collector current and base-emitter junction voltage. Thus, for relatively large changes in collector current, there can be relatively small changes in base-emitter junction voltage. Accordingly, the base-emitter voltage $V_B$ of the transistor $Q_a$ has a value that is proportional to the logarithm value of the collector current $i_o$.

Advantageously, the current $i_p$ $(= i_o)$ is proportional to the illumination of the light receiving surface of the photo diode PD, and, further, the illumination of the light receiving surface is proportional to the object brightness B. With logarithmic compression being made with respect to base 2, the voltage $V_B$ has a value that is proportional to $\log_2 B$. This can be made proportional to the APEX-represented value according to the APEX system of formula (1).

A bias voltage source $V_1$ is provided whose voltage value is proportional to the addition value $S_V - A_V$ where $S_V$ and $A_V$ are the APEX-represented values of film sensitivity S and diaphragm value A, respectively. (The constant proportion is the same as that concerning the voltage $V_B$ and the value $B_V$.) This bias voltage source $V_1$ is connected in series with the emitter electrode of the transistor $Q_a$. Therefore, the base voltage of the transistor $Q_a$ is of a value which is proportional to $B_V + S_V - A_V$, that is $T_V \cdot v_o$ which in turn is proportional to $T_V$ (the APEX-represented value of exposure time T). Thus, the output of the buffer circuit K is a voltage whose value is proportional to $T_V$.

A circuit section is provided in which the collector circuit of a transistor $Q_b$ there is connected a capacitor $C_T$ and a normally-closed type switch $SW_T$ which are connected in parallel with each other. To the emitter electrode of the transistor $Q_b$ there is connected a bias voltage source $V_2$. To the base electrode of transistor $Q_b$ there is applied an input voltage $T_V \cdot v_o$ which is proportional to $T_V$. In response, transistor $Q_b$ has a collector current $i_T$. The value of the bias voltage source $V_2$ is so established that the collector current $i_T$ has a value related to the exposure time T. Advantageously, the circuit design is such that the collector current $i_T$ is of value which is inversely proportional to the exposure time T. In this case, it is necessary that the baseemitter diode characteristics of the transistor $Q_a$ and $Q_b$ be equal to each other.

The normally closed type switch $SW_T$ is caused by conventional camera apparatus (not shown) to switch from "on" to "off" conditions in driving connection with the shutter opening means. Upon opening of the switch $SW_T$, the current $i_T$ causes the capacitor $C_T$ to be charged. After the capacitor has been charged up to a predetermined value, a switching circuit SC so acts that, through the action of a magnet MG, the action of the shutter closing means is controlled, thus automatically providing the desired exposure time.

Now a description will be given of the logarithmic expansion circuit section:

Transistors $A_1, Q_2, \ldots Q_n$, whose base electrodes are connected together, are each an example of a voltage-controlled current source. Each provides for logarithmic expansion operation in connection with the quantizing operation. These transistors are preferably matched to have substantially or identically equal base-emitter voltage vs. collector current characteristics. The emitter electrodes of the transistors $Q_1, Q_2, \ldots Q_n$ are connected to the bias voltage source $V_2$. To the collector circuits of the transistors $Q_1, Q_2, \ldots Q_n$ there are connected resistors $R_1, R_2, \ldots R_n$ respectively so that the collector current $i_c$ of the transistors flows through them. To these resistors $R_1, R_2, \ldots R_n$ there are connected transistors $Q_{1-1}, Q_{2-1}, \ldots Q_{n-1}$ for switching circuit action in such a manner that the voltage drops owing to said resistors and the collector current $i_c$ are applied as inputs to the base-emitters of the transistors respectively. To the collector circuits of the transistors $Q_{1-1}, Q_{2-1}, \ldots Q_{n-1}$ there are connected resistors $r_{1-1}, r_{2-1}, \ldots r_{n-1}$ respectively. In order to cause to operate luminous elements $L_1, L_2, \ldots L_n$ such as lamps or light emission diodes there are provided transistors $Q_{1-2}, Q_{2-2}, \ldots Q_{n-2}$.

Now, when to the base electrodes of the transistors $Q_1, Q_2, \ldots Q_n$ there are applied, as inputs, the output voltage $T_V \cdot v_o$ (which is proportional to $T_V$) of the buffer circuit K, then the collector current $i_c$ of the transistors $Q_1, Q_2, \ldots Q_n$ (this current being of one and equal value for each transistor) is obtained with a value which is proportional to the inverse logarithm of said voltage $T_V \cdot v_o$, that is, a value which is inversely proportional to the exposure time, in the same manner as that of the collector current $i_T$ of the transistor $Q_b$.

The values of the resistors $R_1, R_2 \ldots R_n$ are suitably established in accordance with the exposure time to be quantizedly represented. Voltage drops $e_1, e_2, \ldots e_n$ are produced through said collector current $i_c$ and the said resistors $R_1, R_2, \ldots R_n$, respectively. The switching circuit action transistors $Q_{1-1}, Q_{2-1}, \ldots Q_{n-1}$ each have an offset voltage $e_{off}$. That is, the base-emitter voltage relative to this offset voltage determines whether the collector current of transistor may be regarded as approximately in off state. Through comparison of the voltage drops $e_1, e_2, \ldots e_n$ with the offset voltage $e_{off}$, control of the action of the luminous element is made in accordance with the exposure time to be quantizedly represented.

Now, description will be made herebelow, with the assumption that the luminous elements $L_1, L_2, \ldots L_n$ represent exposure times 1/1000, 1/500, . . . 1/1 seconds, respectively; and there are established the following relations:

$$e_1(\approx i_c R_1) < e_{off},\ e_2(\approx i_c R_2) > e_{off},\ \ldots\ e_n(\approx i_c R_n) > e_{off}.$$

As for $e_1 < e_{off}$, the transistor $Q_{1-1}$ is non-conductive, and therefore the transistor $Q_{1-2}$ is conductive, so that the luminous element $L_1$ is lighted. As for $e_2 > e_{off}$, the transistor $Q_{2-1}$ is conductive, and therefore the transistor $Q_{2-2}$ is non-conductive, so that the luminous element $L_2$ is not lighted. As for $e_n > e_{off}$, the transistor $Q_{n-1}$ is conductive, and therefore the transistor $Q_{n-2}$ is non-conductive, so that the luminous element $L_n$ is not lighted.

Thus, the luminous elements $L_1, L_2, \ldots L_n$, which are provided for quantized representation of exposure time which is automatically controlled by the electrically controlled shutter circuit, are so arranged that the luminous element is lighted corresponding to the determined value, or to a value which is smaller than it, of the exposure time. Accordingly, in the foregoing example, the exposure time is 1/1000 second or less, and less than 1/500 second. If necessary, inversion of lighting mode of said luminous elements can be readily made by addition of a phase inversion circuit. Particularly, the limit indication of the least exposure time which is controllable by the shutter system (generally 1/1000–1/2000 second) can be readily made by lighting the corresponding luminous element.

The foregoing is a description of quantized representation of exposure time with reference to one example as shown in FIG. 1. It is clear that also the value $B_V$ or the value $E_V$ can be quantizedly represented in the same manner by establishing suitable value of the bias voltage sources $V_1$ and $V_2$.

From the foregoing, it should be understood that an important concept underlying the invention is as follows. In operation, a quantized indication of a variable parameter (preferably exposure time) that varies in relation to a variable signal (such as the current $i_p$). A controllable voltage source provides a voltage ($V_B$) that varies in logarithmic relationship with respect to variations in the signal. Through the operation of each of a plurality of voltage-controlled current sources, the variations in this first voltage are transformed into nonlinearity varying current signals. Accordingly, relatively small changes in the first signal result in relatively large changes in the current out of the current sources. In effect, the first voltage is not linearly enlarged. The enlarged current signals are each compared with a plurality of threshold values. Each different threshold value is preferably determined by the combined effect of fixed offset voltage and a resistor having a selected value. The apparatus has the great advantages of relatively simple circuit structure and fully satisfactory performance. The use of a bipolar type transistor in each of the voltage-controlled current sources is especially advantageous.

What is claimed is:

1. Apparatus for providing a quantized indication of a parameter that varies in relation to a variable input signal which comprises:

a logarithmic compression circuit including a controllable voltage source providing a first voltage and control means responsive to the signal for controlling the controllable voltage source so that the first voltage varies in logarithmic relationship with respect to variations in the signal;

a plurality of logarithmic expansion circuits each including a voltage-controlled current source controlled by the first voltage and each having an inverse-logarithmic voltage-in to current-out transfer characteristic; and indicating means including a plurality of threshold-detecting switching elements respectively corresponding to the plurality of expansion circuits, each switching element having a different threshold and being operative to switch between opposite switching conditions in accordance with whether the current out of its corresponding expansion circuit is on one side or the other of its threshold.

2. Apparatus according to claim 1 wherein the logarithmic compression circuit includes a photosensitive element and the control means includes means for controlling the controllable voltage source so that the first voltage has a value proportional to a selected one of the APEX-represented photographic parameters.

3. Apparatus according to claim 2 wherein each voltage-controlled source comprises a bipolar transistor having its base-emitter junction connected to receive the first voltage.

4. Apparatus according to claim 3 wherein the threshold detecting switching elements each include a transistor having a resistor connected in parallel with its base-emitter junction, the current from the corresponding current source being provided to develop a voltage across the resistor.

5. A quantized indication arrangement for a camera, which comprises:

a voltage source providing a voltage whose value is determined in proportion to APEX-represented values of photographic parameters, a controllable current source having said voltage value as its input and having a non-linear input-voltage to output-current transfer characteristic; and comparing means for controlling the quantized indication, the comparing means including switching means operative to switch in accordance with the value of the output current relative to a predetermined threshold value.

6. An arrangement according to claim 5 wherein the controllable current source comprises a bipolar type transistor.

7. An arrangement according to claim 6, wherein said voltage value is applied to the base-emitter junction of the transistor, the transistor having a logarithmically expanded current relative to said voltage value.

8. An arrangement according to claim 5 wherein the comparing means includes a resistor across which there is developed a voltage proportional to the output current, and the switching means comprises a transistor having its base-emitter junction connected in parallel with the resistor.

9. An arrangement according to claim 8 wherein the resistor has a resistance value established in proportion to exposure time.

10. An arrangement according to claim 5 further comprising a plurality of additional ones of said controllable current source, each comprising a transistor having its base-emitter junction connected to receive the voltage value.

* * * * *

UNITED STATES PATENT AND TRADEMARK OFFICE

CERTIFICATE OF CORRECTION

PATENT NO. : 3,895,876

DATED : July 22, 1975

INVENTOR(S) : Chiharu Mori

It is certified that error appears in the above-identified patent and that said Letters Patent are hereby corrected as shown below:

| Location in Patent | |
|---|---|
| Column 1 Line 6 | after "U.S. Pat. No. 3,828,253" add -- ) --; |
| Column 1 Line 13 | after "U.S. Pat. No. 3,807,879" add -- ) --; |
| Column 3 Line 55 | there should be a hyphen between "base" and "emitter"; |
| Column 4 Line 3 | after "Transistors" change "$A_1$" to read -- $Q_1$ --; |
| Column 6 Line 14 | after "age-controlled" insert -- current --. |

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*